(12) United States Patent
Ku et al.

(10) Patent No.: US 8,686,967 B2
(45) Date of Patent: Apr. 1, 2014

(54) TOUCH SCREEN PANEL AND METHOD OF MANUFACTURING THE SAME

(75) Inventors: Sunju Ku, Gyeonggi-do (KR); Heunglyul Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 517 days.

(21) Appl. No.: 12/977,823

(22) Filed: Dec. 23, 2010

(65) Prior Publication Data

US 2012/0097514 A1   Apr. 26, 2012

(30) Foreign Application Priority Data

Oct. 26, 2010 (KR) .......................... 10-2010-0104599

(51) Int. Cl.
*G06F 3/045* (2006.01)

(52) U.S. Cl.
USPC ......................................................... 345/174

(58) Field of Classification Search
USPC .................................. 200/511, 512, 514, 600
See application file for complete search history.

(56) References Cited

U.S. PATENT DOCUMENTS

| | | | | |
|---|---|---|---|---|
| 8,436,830 | B2 * | 5/2013 | Teramoto | 345/174 |
| 8,502,802 | B2 * | 8/2013 | Teramoto | 345/174 |
| 2011/0134055 | A1 * | 6/2011 | Jung et al. | 345/173 |

* cited by examiner

*Primary Examiner* — Renee Luebke
*Assistant Examiner* — Lheiren Mae Caroc
(74) *Attorney, Agent, or Firm* — Morgan, Lewis & Bockius LLP

(57) ABSTRACT

A touch screen panel includes a substrate, a first touch electrode layer including first touch electrodes formed to be divided on regions defined as a pad part, a routing part, and a channel bridge part on the substrate, a soluble insulator layer including soluble insulators formed so as to expose portions of the first touch electrodes, and a second touch electrode layer formed on the soluble insulator layer.

4 Claims, 6 Drawing Sheets

POLISHING BELT PROGRESS DIRECTION

TOUCH SCREEN PANEL AND METHOD OF MANUFACTURING THE SAME

This application claims the benefit of Korean Patent Application No. 10-2010-0104599 filed on Oct. 26, 2010, which is hereby incorporated by reference.

BACKGROUND

1. Field

The present invention relates to a touch screen panel and a method of manufacturing the same.

2. Related Art

In recent years, along with the development of the electronics industry, display devices, such as a liquid crystal display, an electroluminescent display, and a plasma display panel having a quick response speed, low power consumption, and an excellent color reproduction rate, have attracted attentions. The display device is used for various electronic products such as televisions, monitors for computers, notebook computers, mobile telephones, display units for refrigerators, personal digital assistants, automated teller machines, and the like. In general, the display device interfaces with various input devices such as a keyboard, a mouse, and a digitizer. However, when a separate input device such as a keyboard, a mouse, or digitizer is used, a user is required to know how to use the separate input device, and as the separate input device occupies space, customer dissatisfaction is increased. Therefore, there is increasingly a need for a convenient and simple input device that can reduce erroneous operation. Also, there is a need for a touch screen panel in which a user can input information by directly contacting a screen with a finger or a pen.

In touch screen panels, two touch electrode layers are formed on an upper substrate or a lower substrate according to a detection method of a touched portion, a touched portion by a user or the like is recognized by analyzing signals transmitted from the touch electrode layers.

In some touch screen panels in the related art, there has been proposed a structure where a soluble insulator is employed instead of an inorganic protective layer as a material covering the touch electrode layers used to detect touch by a user or the like. However, in the case of the touch screen panels in the related art employing the soluble insulator, there is a problem in that the touch electrode layers formed on the top portion are damaged due to a scratch caused by a polishing belt used during the cleaning of modules.

SUMMARY

According to an exemplary embodiment of the invention, there is provided a touch screen panel including a substrate; a first touch electrode layer including first touch electrodes formed to be divided on regions defined as a pad part, a routing part, and a channel bridge part on the substrate; a soluble insulator layer including soluble insulators formed so as to expose portions of the first touch electrodes; and a second touch electrode layer formed on the soluble insulator layer.

According to an exemplary embodiment of the invention, there is provided a method of manufacturing a touch screen panel, including defining a pad part, a routing part, and a channel bridge part; forming a first touch electrode layer including first touch electrodes formed to be divided on regions defined as a pad part, a routing part, and a channel bridge part on the substrate; forming a soluble insulator layer including soluble insulators which expose a portion of the channel bridge part by ejecting ink on the channel bridge part using an inkjet method; and forming a second touch electrode layer on the soluble insulator layer.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION

Reference will now be made in detail embodiments of the invention examples of which are illustrated in the accompanying drawings.

Hereinafter, embodiments of the invention will be described with reference to the accompanying drawings.

Figure 1:
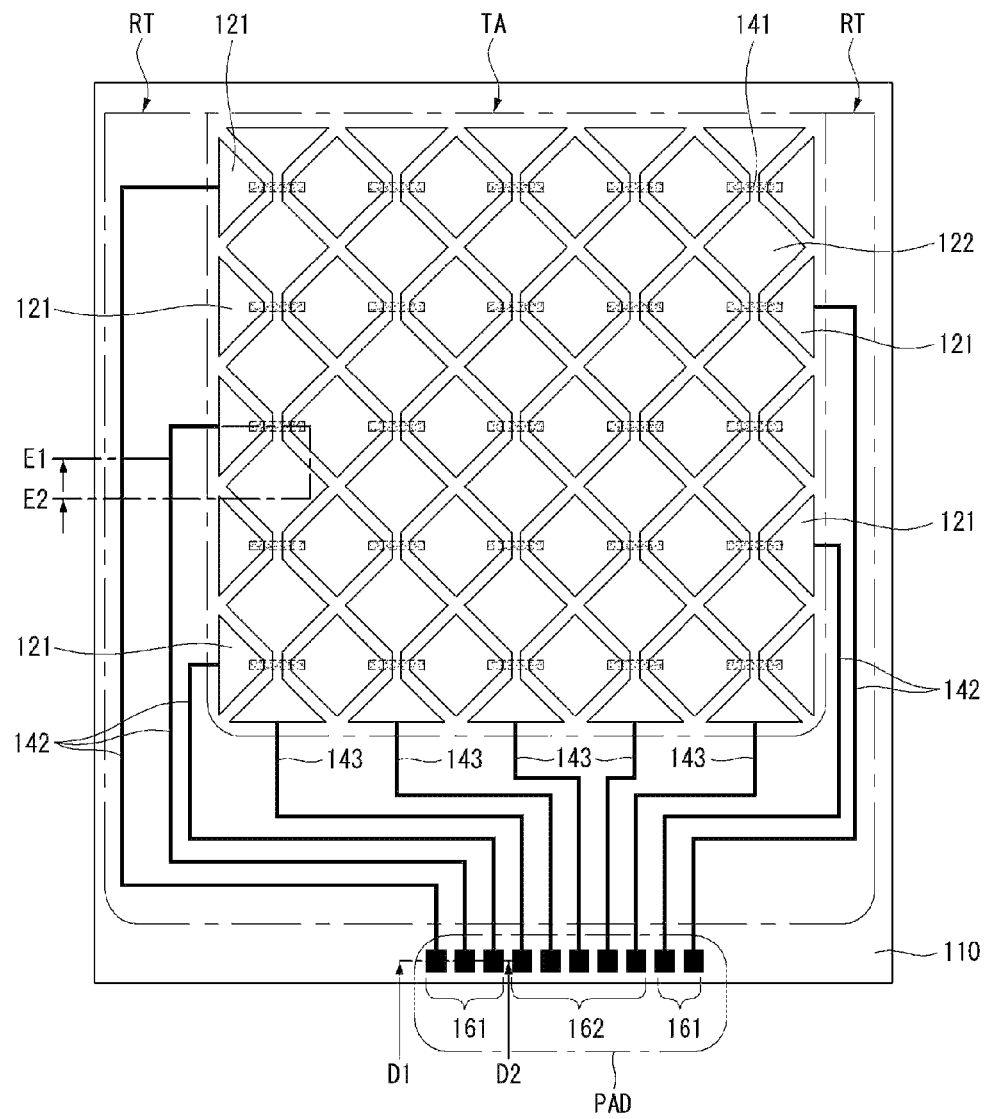
FIG. 1 is a plan view of a touch screen panel according to an embodiment of the invention.

FIG. 1 is a plan view of a touch screen panel according to an embodiment of the invention.

As shown in FIG. 1, the touch screen panel is a capacitive type including a touch electrode forming part TA, a routing part RT, and a pad part PAD.

The touch electrode forming part TA is formed on a region corresponding to an active region in a display panel. The touch electrode forming part TA includes a plurality of first electrodes 121 arranged in parallel in a first direction (for example, an X-axis direction) and a plurality of second electrodes 122 arranged to intersect in a direction (for example, a Y-axis direction) perpendicular to the first electrodes 121. The first electrodes 121 and the second electrodes 122 intersect each other, but sustain an electrical insulation state by an insulation layer (not shown). Further, neighboring first electrodes 121 are connected to each other by a plurality of channel bridges 141. That is, the channel bridges 141 connect the neighboring first electrodes 121 to each other.

The routing part RT is formed on regions corresponding to both peripheries of a non-active region in the display panel. The touch electrode forming part TA includes a plurality of first routing wires 142 connected to the plurality of first electrodes 121, respectively, and a plurality of second routing wires 143 connected to the plurality of second electrodes 122, respectively. This embodiment shows an example where the first routing wires 142 are alternately arranged by one line, but not limited thereto.

The pad part PAD is formed on a region corresponding to one periphery of the non-active region in the display panel. The pad part PAD includes a plurality of first pads 161 connected to the plurality of first electrodes 121 through the plurality of first routing wires 142, respectively, and a plurality of second pads 162 connected to the plurality of second electrodes 122 through the plurality of second routing wires 143, respectively. This embodiment shows an example where the first routing wires 142 are alternately arranged by one line and thus the second pads 162 of the pad part PAD are arranged at both sides of the first pads 161 as shown in the figure, but not limited thereto.

Hereinafter, sectional structures of the pad part, the channel bridge part and the routing part will be described with reference to a partially sectional view taken along the line D1-D2 and the line E1-E2 shown in FIG. 1.

Figure 2:
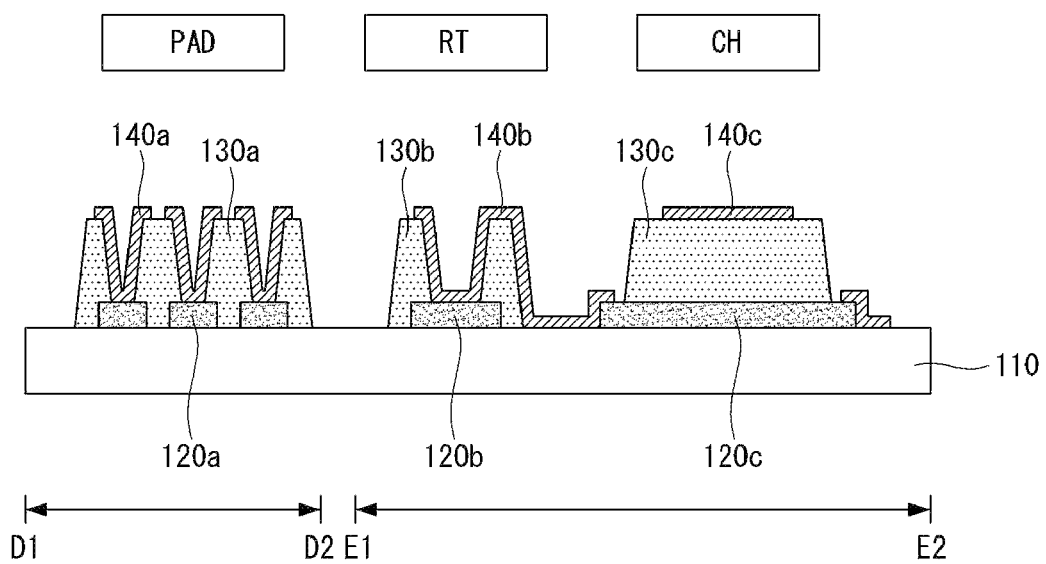
FIG. 2 is a partially sectional view taken along the line D1-D2 and the line E1-E2 shown in FIG. 1.
Figure 3:
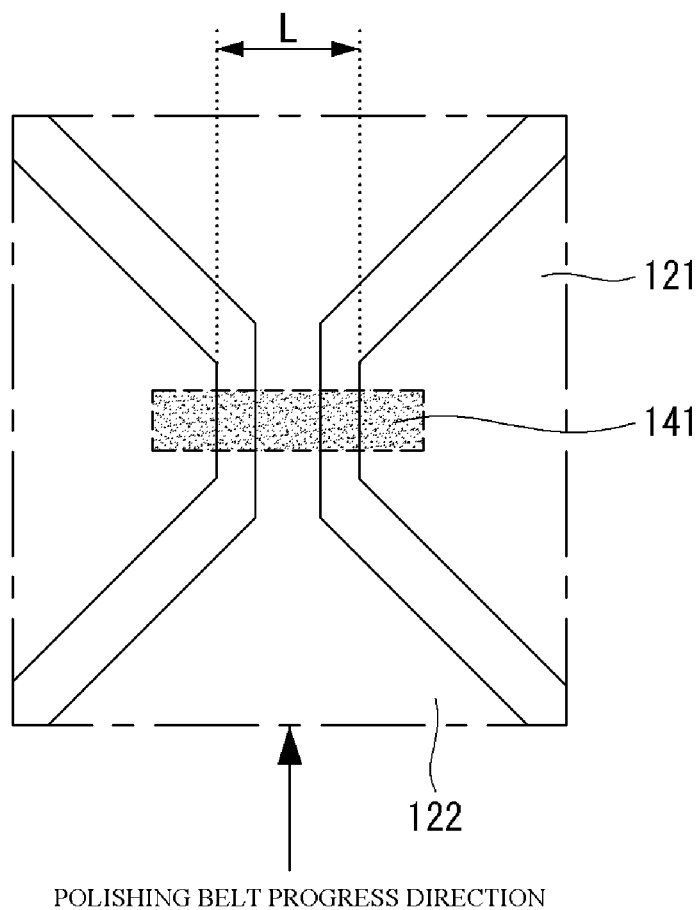
FIG. 3 is a detailed plan view of a touch electrode illustrating prevention of generation of scratch caused by a polishing belt.

FIG. 2 is a partially sectional view taken along the line D1-D2 and the line E1-E2 shown in FIG. 1, and FIG. 3 is a detailed plan view of a touch electrode illustrating prevention of generation of scratch caused by a polishing belt.

As shown in FIG. 2, a first electrode layer includes first electrodes 120a, 120b and 120c which are respectively formed on regions defined as the pad part PAD, the routing part RT, and the channel bridge part CH. A first portion 120a of the first electrodes 120a, 120b and 120c is formed as a pad of the pad part PAD, a second portion 120b thereof is formed as a routing wire of the routing part RT, and a third portion 120c is formed as the channel bridge.

In addition, a soluble insulator layer includes soluble insulators 130a, 130b and 130c which are respectively formed on the pad part PAD, the routing part RT, and the channel bridge part CH such that portions of the first electrodes 120a, 120b and 120c are respectively exposed to be divided. A portion 130c of the soluble insulators 130a, 130b and 130c is formed as a protective layer having an island shape so as to expose a portion of the channel bridge part CH. In other words, the portion 130c is formed to have the island shape so as to expose both sides of the third portion 120c which constitutes the channel bridge. Thereby, neighboring first touch electrodes 121 are connected to each other in a subsequent process. That is to say, a portion 130a of the soluble insulators 130a, 130b and 130c is formed so as to expose a portion of the first portion 120a constituting the pad, another portion 130b thereof is formed so as to expose a portion of the second portion 120b constituting the routing wire, and the other portion 130c thereof is formed so as to expose a portion of the third portion 120c constituting the channel bridge.

A second electrode layer includes second electrodes 140a, 140b and 140c which are respectively formed on the soluble insulators 130a, 130b and 130c. Some 140a and 140b of the second electrodes 140a, 140b and 140c are formed to connect the first portion 120a constituting the pad to the second portion 120b constituting the routing wire and the third portion 120c constituting the channel bridge. Here, the portion 140c is divided in plurality by the island-shaped soluble insulator 130c and is formed on one end and the other end of the third portion 120c formed on the channel bridge part CH, and connects the second portion 120b formed on the routing part RT to the third portion 120c formed on the channel bridge part CH. In addition, the portion 140c positioned on the island-shaped soluble insulator 130c constitutes the second touch electrode 122. In this way, the pads, the wires, and the electrodes are connected to each other by the second electrodes 140a, 140b and 140c as shown in FIG. 1.

As described above, by the use of the soluble insulators 130a, 130b and 130c, the second electrodes 140b and 140c positioned at the uppermost part of the touch screen panel takes up the minimum area. Thereby, during the module cleaning after the touch screen panel is manufactured, a contact area between a polishing belt and the second electrodes 140a, 140b and 140c becomes smaller.

In the touch screen panel manufactured according to the embodiment, the width L of the second touch electrode 122 positioned at the uppermost part is smaller than that in the touch screen panel in the related art. The direction of the second touch electrode 122 positioned at the uppermost part can be formed to correspond to the direction where the polishing belt passes. Therefore, during the module cleaning, the polishing belt cannot polish the inside of the second touch electrode 122 positioned at the uppermost part, and thus it is possible to prevent the electrode from being disconnected by the scratch due to the polishing belt.

A manufacturing method of the touch screen panel according to an embodiment of the invention will now be described.

Figure 4:
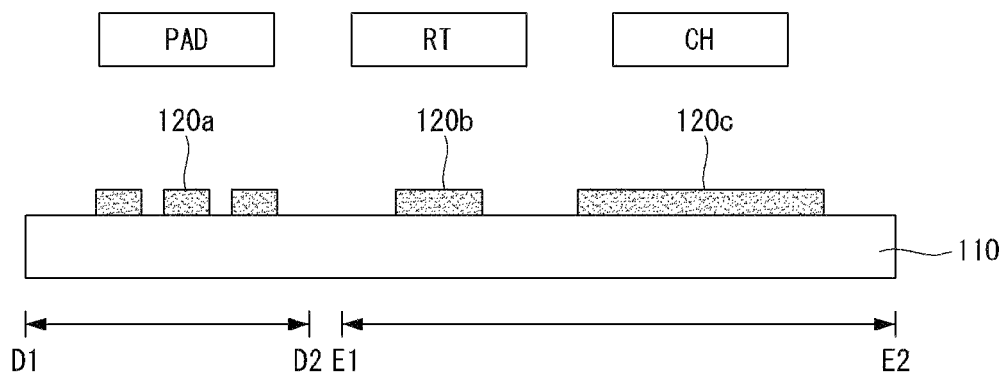
FIGS. 4 to 6 are sectional views illustrating a method of manufacturing a touch screen panel according to an embodiment of the invention.
Figure 5:
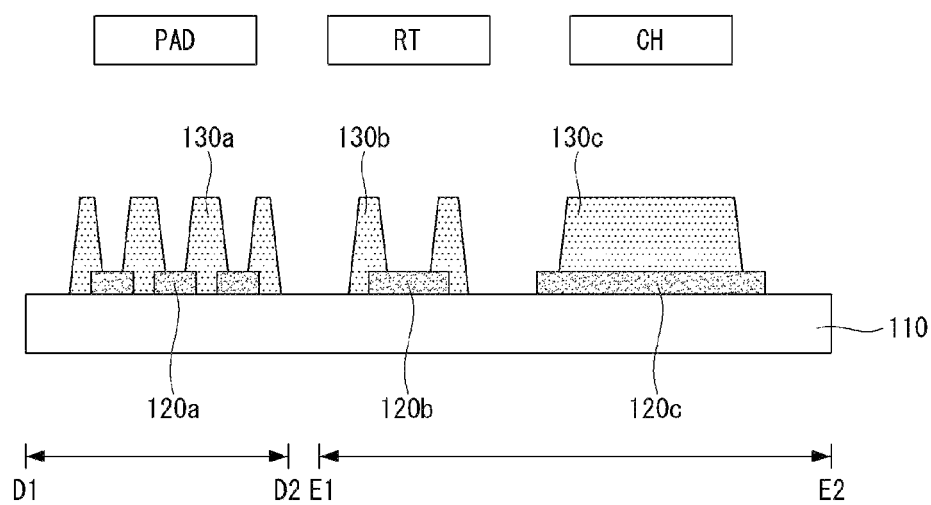
Figure 6:
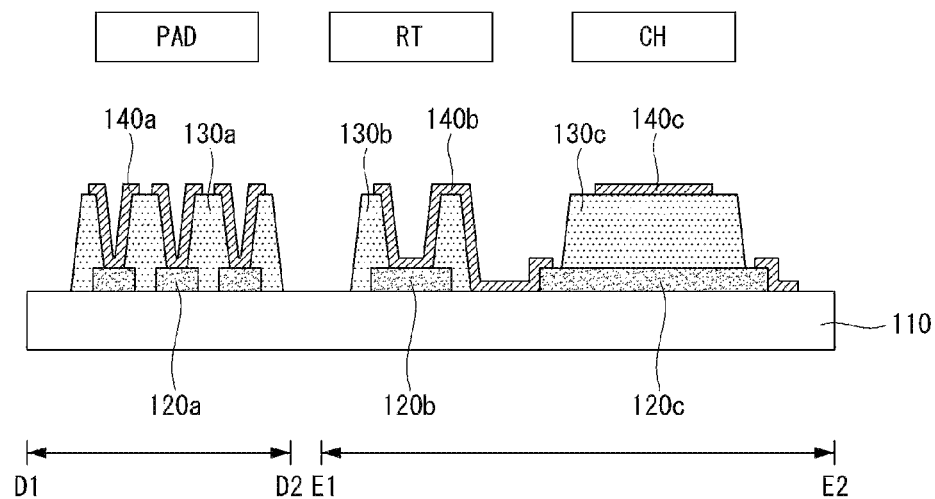

FIGS. 4 to 6 are sectional views illustrating a method of manufacturing the touch screen panel according to an embodiment of the invention.

As shown in FIG. 4, the pad part PAD, the routing part RT, and the channel bridge part CH are defined on the substrate 110. The definition of the pad part PAD, the routing part RT, and the channel bridge part CH is made according to FIG. 1.

As shown in FIG. 4, the first electrode layer is formed which includes the first electrode layers 120a, 120b and 120c respectively formed on the pad part PAD, the routing part RT, and the channel bridge part CH. The first electrodes 120a, 120b and 120c are formed on the substrate 110 by a deposition method, and then are formed separately from each other on the pad part PAD, the routing part RT, and the channel bridge part CH by a photolithography process, a wet etching, and a stripe process. Thereby, a portion 120a of the first touch electrode layers 120a, 120b and 120c is formed as the pad of the pad part PAD, another portion 120b thereof is formed as the routing wire of the routing part RT, and the other portion 120c thereof is formed as the channel bridge.

As shown in FIG. 5, the soluble insulators 130a, 130b and 130c are formed which respectively expose a portion of the pad part PAD, a portion of the routing part RT, and a portion of the channel bridge part CH. The soluble insulators 130a, 130b and 130c are formed to have an island shape so as to respectively expose a portion of the pad part PAD, a portion of the routing part RT, and a portion of the channel bridge part CH. For example, the soluble insulator 130c has the island shape such that both sides of the first electrode 120c constituting the channel bridge are exposed. Thereby, the neighboring first touch electrodes 121 are connected to each other in the subsequent process. Thus, a portion 130a of the soluble insulators 130a, 130b and 130c is formed so as to expose a portion of the first portion 120a constituting the pad, another portion 130b thereof is formed so as to expose a portion of the second portion 120b constituting the routing wire, and the other portion thereof is formed so as to expose a portion of the third portion 120c constituting the channel bridge.

As shown in FIG. 6, the second electrodes 140a, 140b and 140c are respectively formed on the soluble insulators 130a, 130b and 130c. The second electrodes 140a, 140b and 140c are formed separately from each other on the pad part PAD, the routing part RT, and the channel bridge part CH, by a photolithography process, a wet etching, and a stripe process. Therefore, some 140a and 140b of the second touch electrode layers 140a, 140b and 140c are formed to connect the first portion 120a constituting the pad to the second portion 120b constituting the routing wire and the third portion 120c constituting the channel bridge. Here, the portion 140c is divided in plurality by the island-shaped soluble insulator 130c and is formed on one end and the other end of the third portion 120c formed on the channel bridge part CH, and connects the second portion 120b formed on the routing part RT to the third portion 120c formed on the channel bridge part CH. In addition, the portion 140c positioned on the island-shaped soluble insulator 130c constitutes the second touch electrode 122. In this way, the pads, the wires, and the electrodes are connected to each other by the second electrodes 140*a*, 140*b* and 140*c* as shown in FIG. 1.

Figure 7:
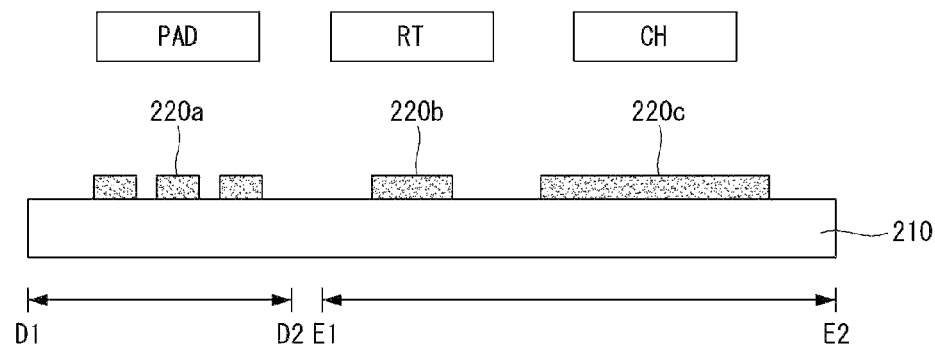
FIGS. 7 to 9 are sectional views illustrating a method of manufacturing a touch screen panel according to another embodiment of the invention.
Figure 8:
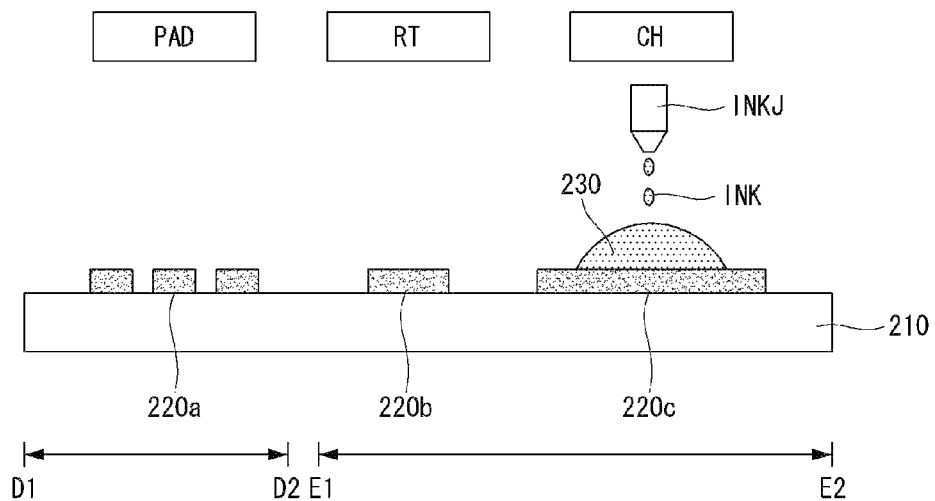
Figure 9:
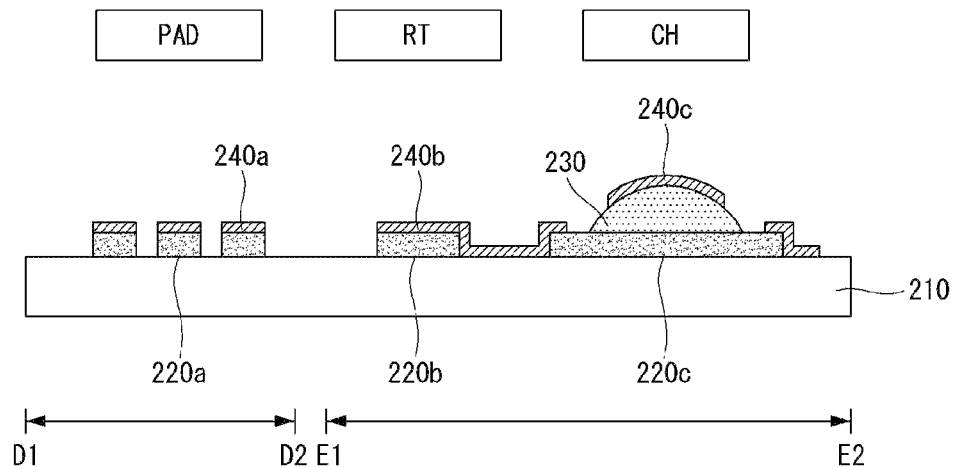

FIGS. 7 to 9 are sectional views illustrating a method of manufacturing the touch screen panel according to another embodiment of the invention.

As shown in FIG. 7, the pad part PAD, the routing part RT, and the channel bridge part CH are defined on a substrate 210. The definition of the pad part PAD, the routing part RT, and the channel bridge part CH is made according to FIG. 1.

As shown in FIG. 7, first electrodes 220*a*, 220*b* and 220*c* are respectively formed on the pad part PAD, the routing part RT, and the channel bridge part CH. Thereby, a portion 220*a* of the first touch electrode layers 220*a*, 220*b* and 220*c* is formed as the pad of the pad part PAD, another portion 220*b* thereof is formed as the routing wire of the routing part RT, and the other portion 220*b* thereof is formed as the channel bridge.

As shown in FIG. 8, a soluble insulator 230 exposing a portion of the channel bridge part CH is formed on the channel bridge part CH by ejecting ink INK using an inkjet INKJ. The soluble insulator 230 formed by the inkjet may have a curved surface.

Since the soluble insulator 230 can be formed only on desired regions by using the inkjet INKJ, the soluble insulator 230 may be optionally formed on the pad part PAD and the routing part RT as shown in FIG. 6. In addition, by using the inkjet INKJ, it is possible to simplify the manufacturing process and decrease manufacturing costs due to reduction in the number of masks to be used.

As shown in FIG. 9, second electrodes 240*a*, 240*b* and 240*c* are formed on the soluble insulator 230. Therefore, some 240*a* and 240*b* of the second electrodes 240*a*, 240*b* and 240*c* are formed to connect the first electrode 220*a* constituting the pad to the first electrode 220*b* constituting the routing wire and the first touch electrode layer 220*c* constituting the channel bridge. Here, the portion 240*c* is divided in plurality by the island-shaped soluble insulator 230*c* and is formed on one end and the other end of the third portion 220*c* formed on the channel bridge part CH, and connects the second portion 220*b* formed on the routing part RT to the third portion 220*c* formed on the channel bridge part CH. In addition, the portion 240*c* positioned on the island-shaped soluble insulator 230*c* constitutes the second touch electrode 122. In this way, the pads, the wires, and the electrodes are connected to each other by the second electrodes 240*a*, 240*b* and 240*c* as shown in FIG. 1.

The touch screen panel described above is applicable to a display device such as a liquid crystal display (LCD), a field emission display (FED), a plasma display panel (PDP), an electroluminescence device (EL), an electrophoretic device, or the like. In this case, the substrate of the touch screen panel according to the embodiment may be selected as a substrate constituting the display device.

According to the invention, it is possible to prevent the disconnection of the electrodes of the touch electrode layer formed at the uppermost part, by the scratch during the module cleaning, and to reduce the number of masks by using the island-shaped soluble insulator which can protect the electrodes and which is formed using a photolithography process and an inkjet process, thereby simplifying a manufacturing process and reducing manufacturing costs. Furthermore, according to the invention, by minimizing the area of the touch electrode layer formed positioned at the uppermost part of the touch screen panel and matching the direction of the touch electrode layer with the progressing direction of polishing belt, it is possible to decrease the scratch generated during the polishing operation.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A touch screen panel comprising:
   a substrate;
   a first touch electrode layer including first touch electrodes formed to be divided on regions defined as a pad part, a routing part, and a channel bridge part on the substrate;
   a soluble insulator layer including soluble insulators formed so as to expose portions of the first touch electrodes; and
   a second touch electrode layer including second touch electrodes formed on the soluble insulator layer,
   wherein the soluble insulator layer has an island shape so as to expose a portion of the channel bridge part, and
   wherein a portion of the second touch electrode layer and one end and the other end of the first touch electrode layer formed on the channel bridge part are divided in plurality by an island-shaped soluble insulator, and connects the first touch electrode layer formed on the routing part to the first touch electrode layer formed on the channel bridge part.

2. A method of manufacturing a touch screen panel, comprising:
   defining a pad part, a routing part, and a channel bridge part;
   forming a first touch electrode layer including first touch electrodes formed to be divided on regions defined as a pad part, a routing part, and a channel bridge part on the substrate;
   forming a soluble insulator layer including soluble insulators formed so as to expose portions of the first touch electrodes; and
   forming a second touch electrode layer including second touch electrodes on the soluble insulator layer, wherein the soluble insulator has an island shape so as to expose a portion of the channel bridge part, and wherein a portion of the second touch electrode layer and one end and the other end of the first touch electrode layer formed on the channel bridge part are divided in plurality by an island-shaped soluble insulator, and connects the first touch electrode layer formed on the routing part to the first touch electrode layer formed on the channel bridge part.

3. The method of claim 2, wherein the soluble insulator is formed to have an island shape such that a portion of the pad part, a portion of the routing part, and a portion of the channel bridge part are exposed to be divided, by a photolithography process.

4. A method of manufacturing a touch screen panel, comprising:
   defining a pad part, a routing part, and a channel bridge part;

forming a first touch electrode layer including first touch electrodes formed to be divided on regions defined as a pad part, a routing part, and a channel bridge part on the substrate;

forming a soluble insulator layer including soluble insulators which expose a portion of the channel bridge part by ejecting ink on the channel bridge part using an inkjet method; and forming a second touch electrode layer including second touch electrodes on the soluble insulator layer, wherein the soluble insulator has an island shape so as to expose a portion of the channel bridge part, and wherein a portion of the second touch electrode layer and one end and the other end of the first touch electrode layer formed on the channel bridge part are divided in plurality by an island-shaped soluble insulator, and connects the first touch electrode layer formed on the routing part to the first touch electrode layer formed on the channel bridge part.

* * * * *